United States Patent
Mizikovsky et al.

[19]

[11] Patent Number: 5,960,363

[45] Date of Patent: Sep. 28, 1999

[54] TONE GENERATING APPARATUS FOR A CELLULAR TELEPHONE TO SIMULATE TONES NORMALLY SENSED BY A USER OF A LAND-LINE TELEPHONE

[75] Inventors: Semyon Mizikovsky, Morganville, N.J.; Geoffrey Anderson, San Diego, Calif.; Gerard Wahl, Kendall Park, N.J.; Peter Douma, Wyckoff, N.J.; Masaaki Akahane, Mahwah, N.J.

[73] Assignees: Sony Corporation, Tokyo, Japan; Sony Electronics, Inc., Park Ridge, N.J.

[21] Appl. No.: 08/690,489

[22] Filed: Jul. 31, 1996

Related U.S. Application Data

[60] Provisional application No. 60/010,535, Jan. 24, 1996.

[51] Int. Cl.$^6$ ........................................................ H04B 1/38
[52] U.S. Cl. ........................... 455/552; 455/575; 455/550; 379/444
[58] Field of Search ................................. 455/35.1, 36.1, 455/564, 38.5, 550, 552, 575; 379/444, 59, 40; 370/397

[56] References Cited

U.S. PATENT DOCUMENTS

| | | | |
|---|---|---|---|
| 4,233,473 | 11/1980 | Frost | 455/432 |
| 5,117,450 | 5/1992 | Joglekar et al. | 455/557 |
| 5,535,260 | 7/1996 | Zicker | 455/564 |
| 5,680,439 | 10/1997 | Aguilera et al. | 379/40 |
| 5,724,656 | 3/1998 | Vo et al. | 455/422 |

*Primary Examiner*—Edward F. Urban
*Assistant Examiner*—Isaak R. Jama
*Attorney, Agent, or Firm*—Frommer Lawrence & Haug, LLP.; William S Frommer; Dennis M Smid

[57] ABSTRACT

Tone generating apparatus for a cellular telephone simulates those tones normally sensed by a user of a conventional land-line telephone. The cellular telephone is adapted to communicate with a base station via a service provider which provides different types of service, such as HOME service, ROAM service, or alternate HOME service. A progress tone generator is actuable to generate for the user selected dial tone indications as a function of the detected type of service provided by the service provider. In addition, when the keypad of the cellular telephone is operated, digit tones identifying the actuation of the respective keys are generated as is digit data which represents those keys; the digit data being transmitted to the base station to dial a respective telephone number. A warning indication, such as a distinctive tone, is generated in the event that the digit data does not represent a valid telephone number.

19 Claims, 3 Drawing Sheets

TONE GENERATING APPARATUS FOR A CELLULAR TELEPHONE TO SIMULATE TONES NORMALLY SENSED BY A USER OF A LAND-LINE TELEPHONE

This application claims the benefit of U.S. Provisional Application 60/010,535, filed Jan. 24, 1996.

BACKGROUND OF THE INVENTION

This invention relates to wireless common carrier telecommunications systems, such as cellular telephone systems and, more particularly, to the generation in such systems of tones of the type normally sensed by a user of a conventional land-line telephone. The present invention also is applicable to land-line telephone systems of the type having a switch that operates with "out-of-band" signalling.

A typical wireless common carrier telecommunications system, such as a cellular telephone system, a personal communications system, or the like, provides communication between a base station located in a particular cell and a cellular telephone (or a personal communication device) which may be mobile and may move from one cell to another. The user of the cellular telephone (for convenience, as used herein, "cellular telephone" is intended to refer to both cellular telephones and personal communication devices, as well as other analogous communication equipment) normally subscribes to a particular service provider which provides telecommunications service in a number of cells throughout a particular geographical area. The service provider to which the user of the cellular telephone subscribes is referred to as the HOME system and, typically, favorable features are available from and beneficial tariffs are charged by the HOME system.

When the user of the cellular telephone is located in a cell that is serviced by a service provider to which the user does not subscribe, the user is referred to as a ROAMER, and is subject to higher tariffs for telecommunications service. To reduce the likelihood that a user may ROAM into a cell that is serviced by a service provider to which he does not subscribe, a heavy user of cellular telephone service may subscribe to a secondary service provider, referred to as an alternate HOME system. Of course, there is the possibility that the user may find himself in a geographical area in which no cellular telephone system is available.

In the foregoing instances, when power is supplied to the cellular telephone, as by actuating a POWER switch, thereby initiating an initialization operation, the service indication of the type of service that is available to the user (i.e. HOME, alternate HOME, ROAM or NO SERVICE) typically is provided by a visual indication on the cellular telephone device itself. This is derived from the usual Overhead Message Train transmitted from a base station via a Forward Control Channel and received by the cellular telephone device which detects the overhead message train and provides the appropriate indication derived therefrom. This, of course, is a method of using a telephone which is quite different from that with which a typical telephone user has become accustomed. That is, the usual audible tones which normally are present in a land-line telephone system, such as dial tone, service availability, busy circuits, and the like, are not present in cellular telephone systems.

The foregoing feature of providing an Overhead Message Train in a Forward Control Channel which is separate from the channel in which audio communication is transmitted (voice signals communicated from the base station to the cellular telephone are transmitted over a forward audio channel and voice signals communicated from the cellular telephone back to the base station are transmitted over a reverse audio channel) is referred to as out-of-band signalling (the communication of voice signals between the cellular telephone and the base station is referred to as in-band signalling). Such out-of-band signalling is not limited solely to cellular telephone systems, and often is found in land-line telephone switches having serving nodes which indicate service availability and respond to "line request" messages with "line granting" responses, analogous to the messages transmitted over the forward and reverse control channels in a cellular telephone system. Here too, out-of-band signalling in a land-line system furnishes a user with indications with which he may not be accustomed. That is, the various dial tones normally generated in conventional telephone systems may not be present in a land-line system which uses a switch providing out-of-band signalling.

It also is a characteristic operational feature of cellular telephone systems (and other out-of-band signalling systems) to assemble telephone number data and then transmit that data to the base station to initiate a "dialing" operation. Typically, the keys of the cellular telephone keypad are actuated and the actuation of each key is displayed. When the user observes the display of a complete telephone number, the usual SEND key is operated, thereby transmitting to the base station over the reverse control channel the assembled telephone number data. There is, however, no preliminary analysis of the assembled telephone number data prior to its transmission to the base station. As a result, errors that may be made by the user, such as entering an erroneous area code, entering too few or too great a number of digits, or the like, are not uncovered until the telephone number data is analyzed at the base station. Consequently, unnecessary delays may be introduced into completing a correct telephone call or indicating an erroneous telephone number, thereby providing a level of frustration to the user of the telephone equipment.

It is recognized, then, that the operation of a cellular telephone or other out-of-band telephone system differs from the operation of a conventional land-line telephone. The absence of dial tones and DTMF tones when generating telephone number data can be troublesome to the novice user of cellular telephone equipment. Also, the various visual indications associated with cellular telephones is implemented by costly and power consuming devices which adds to the price of consumer equipment.

OBJECTS OF THE INVENTION

Therefore, it is an object of the present invention to provide a cellular telephone that is easy to operate and that is "user friendly."

Another object of this invention is to provide a cellular telephone whose operation is analogous to that of conventional land-line telephones and, thus, is familiar and convenient to users who otherwise may not be comfortable with cellular telephone operation.

A further object of this invention is to provide a cellular telephone with various tone indications representative of, for example, service availability, telephone number accuracy, and the like, thereby avoiding the need of the user to rely solely upon visual displays.

Still another object of this invention is to provide a cellular telephone, as well as other telephone systems in which out-of-band signalling is used to communicate telephone system control information, with various supervisory tones normally sensed by a user of a land-line telephone.

Various other objects, advantages and features of the present invention will become readily apparent from the ensuing detailed description, and the novel features will be particularly pointed out in the appended claims.

SUMMARY OF THE INVENTION

In accordance with this invention, tone generating apparatus is provided in a cellular telephone in order to simulate tones normally sensed by a user of a land-line telephone. A progress tone generator is actuable to generate selected dial tone indications as a function of the type of service that is provided by a service provider to this cellular telephone for communication with a base station. For example, tones indicative of HOME service, ROAM service, alternate HOME service and NO SERVICE indications may be generated. The respective tones are uniquely distinctive and, thus, easily recognizable by the user. Alternatively, voice messages, rather than simply tones, may be synthesized to indicate the type of service that is available.

In accordance with this invention, the operation of a keypad produces digit data representing a dialed telephone number and also generates digit tones, such as DTMF tones. The validity of the telephone number that is generated by the user is determined prior to transmission to the base station; and if an invalid telephone number is produced, a suitable tone indication is generated.

In accordance with one aspect, a time-out indication is generated if a predetermined time period expires between successive actuations of the keypad before a complete telephone number has been produced. In that event, a time-out tone is produced.

As another aspect, the generation of a complete telephone number is sensed and, if determined to be a valid telephone number, the telephone number data is supplied to a transmitter in the cellular telephone for transmission to the base station. If, however, it is determined that the telephone number is not valid, a distinctive NO SUCH NUMBER tone (or, alternatively, a synthesized voice message) is generated.

As a feature of this invention, the various tones which have been discussed above are generated by a progress tone generator which initially is preset to provide a particular dial tone indication; and when the cellular telephone is placed in an OFF-HOOK condition, the progress tone generator is actuated to generate the preset dial tone.

As yet another aspect, the validity of a telephone number is determined by sensing whether the number of dial digits that had been selected by the user corresponds to a valid telephone number. A prefix sensor is provided to sense a predetermined prefix digit, for example, a 1 or 0, followed by a predetermined number of dialed digits (e.g. 10 digits). As another example, an area code sensor determines whether a preestablished group of dialed digits that follows the prefix digit identifies an area code and, if not, whether more than a fixed quantity (e.g. 7) of dialed digits had been produced. If more than the fixed quantity of dial digits had been generated, a distinctive NO SUCH NUMBER tone is generated.

As a still further aspect, if the total number of dial digits that had been produced following the predetermined time-out is less than the number of digits which constitute a valid telephone number, a distinctive NO SUCH NUMBER tone indication is generated.

BRIEF DESCRIPTION OF THE DRAWINGS

The following detailed description, given by way of example and not intended to be limited solely to the embodiments described herein, will best be understood in conjunction with the accompanying drawings in which.

DETAILED DESCRIPTION OF PREFERRED EMBODIMENTS

Figure 1:
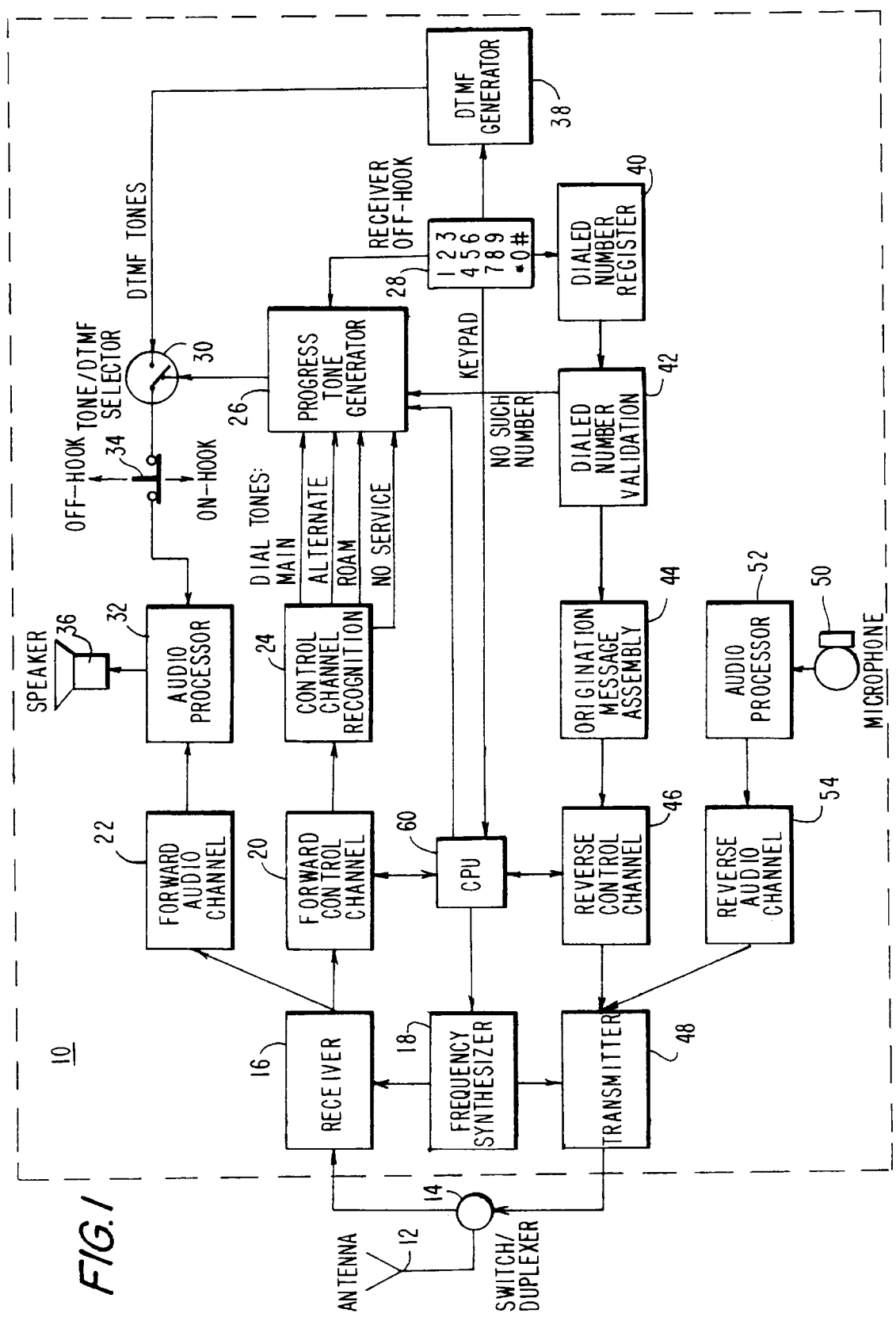
FIG. 1 is a block diagram of a cellular telephone system in which the present invention finds ready application.

Referring first to FIG. 1, there is illustrated a functional block diagram of signalling apparatus 10 in accordance with the present invention, incorporated into a cellular telephone adapted to communicate with a base station. As is known to those of ordinary skill in the art, signals are transmitted from the base station to the cellular telephone over a forward control channel and a forward audio channel; and information is returned from the cellular telephone to the base station over a reverse control channel and a reverse audio channel. Audio signals are transmitted over the audio channels and various control and supervisory signals are transmitted over the control channels. For example, an overhead message train transmitted from the base station to the cellular telephone over the forward control channel includes data representing the type of service that is available, the particular broadcast frequencies over which control and audio information may be transmitted as well as various other signals which are known to those of ordinary skill in the art. An antenna 12 at cellular telephone is adapted to received control and audio signals from the base station as well as to transmit control and audio signals to the base station. The antenna is coupled to a switch/duplexer 14 which directs received signals to a receive channel path and outputs transmitted signals from a transmit channel path.

The receive channel path includes a receiver 16, a forward control channel separator 20 and a forward audio channel separator 22. Receiver 16 is adapted to act as a tuner and is supplied with a selected tuning frequency by a frequency synthesizer 18 for demodulating the received control and audio channel signals. A central processor (CPU) 60 is coupled to frequency synthesizer 18 to select the demodulating frequency to be supplied to receiver 16. The demodulated control and audio signals from receiver 16 are coupled to forward control channel separator 20 and to forward audio channel separator 22 for separating the control and audio signals, respectively.

A control channel recognition circuit 24 is coupled to forward control channel separator 20 and is adapted to recognize and supply as separate output signals indications of the type of service that is available to this cellular telephone from the base station with which it is in communication. Examples of such service provider indications are a main HOME indication which means that the base station that is serviced by the service provider is the primary service provider to which the user of this cellular telephone subscribes; an alternate HOME indication, which means that the service provider for this base station is the secondary service provider to which the user subscribes; a ROAM indication, which means that the service provider which services the base station is one to which the user does not subscribe; and a NO SERVICE indication, which means that service is not provided or available to this cellular telephone user. These indications are supplied from control channel recognition circuit 24 to progress tone generator 26.

Forward control channel separator 20 also is coupled to CPU 60 to provide the CPU with an indication of whether a cellular telephone channel has been received. If not, the CPU advances frequency synthesizer 18 to tune the cellular telephone to another channel. In this manner, user accessible communication channels provided by the base station are scanned.

Figure 2:
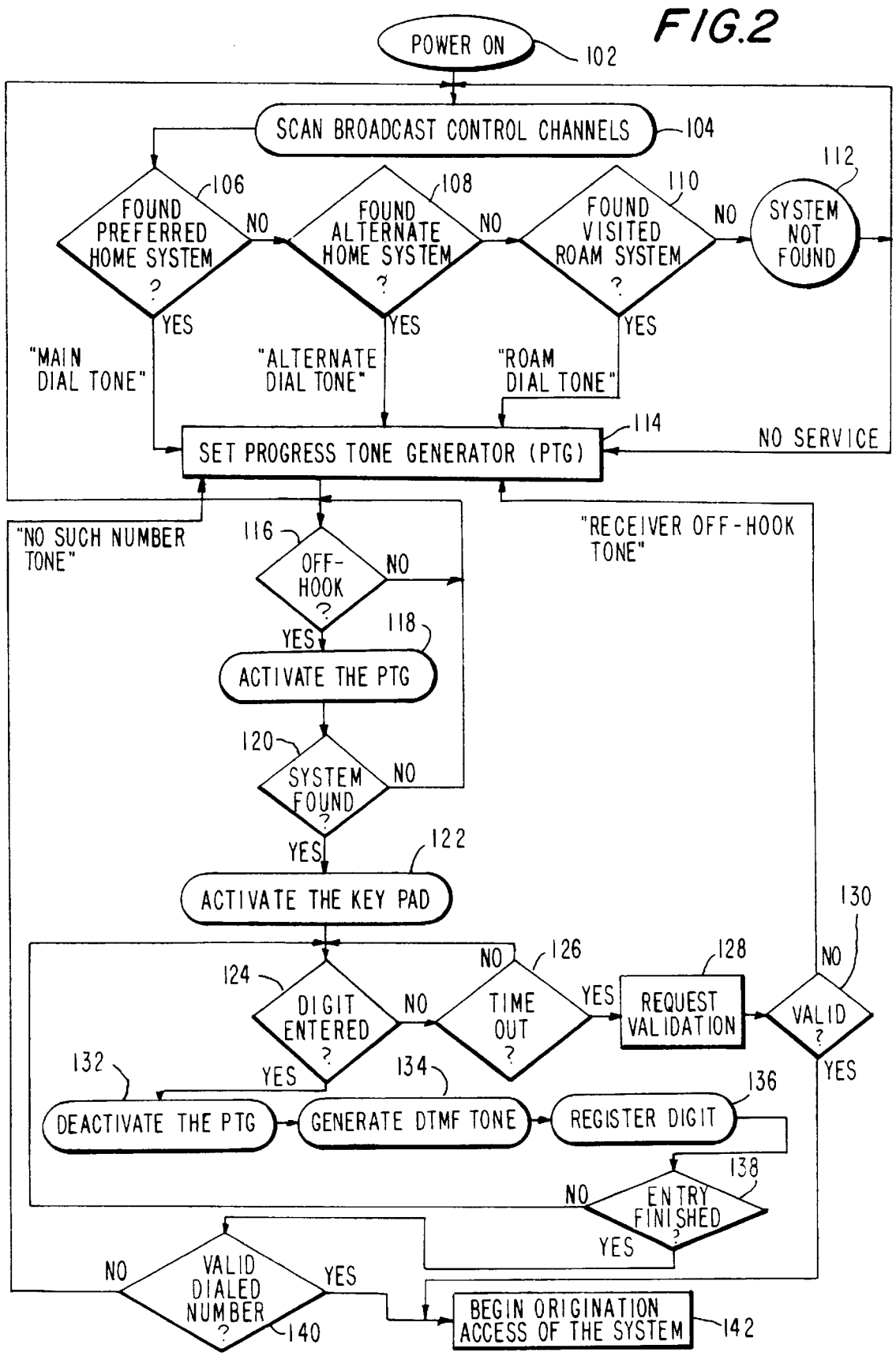
FIG. 2 is a flow chart representing the operation of the CPU shown in FIG. 1 to implement the features of the present invention.

Progress tone generator 26 is operable under the control of CPU 60, as will be described below in connection with FIG. 2, so as to be preset to generate a distinctive tone corresponding to one of the indications supplied thereto. For example, the progress tone generator is adapted to generate a first distinctive dial tone when supplied with the main HOME indication, a second distinctive dial tone when supplied with the alternate HOME indication, a third distinctive dial tone when supplied with the ROAM indication and a fourth distinctive dial tone when supplied with the NO SERVICE indication. Alternatively, the progress tone generator may be constructed as a voice synthesizer adapted to synthesize four distinctive voice messages in response to the main HOME, alternate HOME, ROAM and NO SERVICE indications supplied thereto.

The output of progress tone generator 26 is coupled by way of a selector switch 30 and a hook switch 34 to an audio processor 32 which drives a loudspeaker 36 to generate audible tones corresponding to the distinctive tones (or voice messages) generated by the progress tone generator. Hook switch 34 may take the form of a suitable mechanical switch, a push button, a predetermined key, or the like which functions in a manner analogous to the convention hook switch of a land-line telephone instrument. The hook switch thus provides an indication of whether the cellular telephone is in its ON-HOOK condition or its OFF-HOOK condition, these conditions being substantially the same as the corresponding "ON-HOOK" and "OFF-HOOK" conditions of a land-line telephone. In an alternative embodiment of the present invention, hook switch 34 may be omitted.

A keypad 28 is coupled to progress tone generator 26 and is adapted to be manually operated by the user of the cellular telephone to generate telephone dialing digits. In this regard, keypad 28 may be similar to the keypad provided on a conventional land-line telephone. Keypad 28 also may be provided with additional keys, or switches, typically provided in conventional cellular telephones; and in the interest of brevity, further description of such additional keys is not provided. Keypad 28 is coupled to CPU 60 which, as will be described below, functions to determine when the user has completed dialing a telephone number and then determines whether the dialed telephone number is valid. The keypad also is coupled to progress tone generator 26 to indicate when the user has placed the cellular telephone in an "OFF-HOOK" condition. For example, when the first digit of a telephone number has been dialed, an OFF-HOOK indication is supplied to the progress tone generator. As an other example, when a key or switch is operated to answer an incoming telephone call, the progress tone generator is supplied with an "OFF-HOOK" condition.

Keypad 28 also is coupled to DTMF tone generator 38 which supplies conventional DTMF dialing tones through selector 30 to audio processor 32 corresponding to the particular digits which are dialed by the actuation of the keypad. The DTMF tone generator may be conventional and further description thereof therefore need not be provided.

Selector 30 operates to supply to audio processor 32 either the progress tones generated by progress tone generator 26 (e.g. the distinctive tones discussed above) or the DTMF tones generates by DTMF tone generator 38. Normally, progress tone generator 26 is coupled to audio processor 32 until a dialing operation is initiated, whereupon selector 30 couples DTMF tone generator 38 to the audio processor. Although not shown, it will be appreciated that once keypad 28 is actuated, selector 30 changes over from its selection of the progress tone generator to its selection of the DTMF tone generator.

Forward audio channel separator 22 also is coupled to audio processor 32 and is adapted to supply audio signals, such as the voice information of a telephone conversation, to the audio processor. Forward audio channel separator 22 and its function of separating received voice signals form no part of the present invention per se and further description thereof is not provided.

The transmit channel of the cellular telephone includes a transmitter 48 coupled to a reverse control channel assembler 46 as well as a reverse audio channel assembler 54. The transmitter also is coupled to frequency synthesizer 18 which supplies a modulating frequency corresponding to the transmission channel over which the cellular telephone communicates with the base station. Reverse audio channel assembly 54 is coupled to an audio processor 52 which receives voice signals from a microphone 50. The audio processor thus supplies to reverse audio channel assembler 54 the user's voice signals, thereby permitting the user to converse with the base station.

Reverse control channel assembler 46 is coupled to an origination message assembly circuit 44 and is controlled by CPU 60 to assemble suitable reverse control messages, such as a dialed telephone number, for transmission to the base station. The telephone number data supplied to origination message assembly circuit 44 is derived from a dialed number register 40 which is adapted to receive and store the dial digits generated by the user's operation of keypad 28. As illustrated, the output of the dialed number register is coupled to a dialed number validation circuit 42 which operates to determine if the dialed telephone number stored in register 40 is a valid telephone number. If not, a NO SUCH NUMBER indication is coupled to progress tone generator 26 and a distinctive tone indication (or synthesized voice message) is produced.

Verification of the validity of a dialed telephone number is based upon the North American Numbering Plan (NANP) and Dialing Procedures, as set out in Bellcore Special Report SR-TSV-002275, Issue Mar. 1, 1991. Examples of the NANP and Dialing Procedures include the following: determining, after no dialed digits have been entered after a predetermined time, whether the proper number of digits has been entered; sensing whether the prefix 1 or 0 (or other predetermined prefix) is followed by the proper number of dial digits (e.g. 10 digits); sensing whether a proper area code has been entered. Reference is made to the aforementioned Bellcore Special Report for a more complete description of the NANP and Dialing Procedures by which the validity of a telephone number may be verified.

The manner in which CPU 60 operates to control progress tone generator 26 and to determine, prior to the transmission of a telephone number, whether that telephone number is valid, now will be described in conjunction with the flow chart shown in FIG. 2. Initially, when power to the cellular telephone is turned on, as represented by instruction 102, CPU 60 controls frequency synthesizer 18 to scan the broadcast control channels transmitted by the base station, as represented by instruction 104.

Based upon the overhead message train received from the base station and separated by the forward control channel separator 20, CPU 60 inquires, at 106, whether the service provider which services the base station is the main HOME system. If inquiry 106 is answered in the affirmative, progress tone generator 26 is preset to generate the distinctive tone indicative thereof, and designated in FIG. 2 as the "main" tone. It will be noted that, at this time, although the progress tone generator is preset, no audible tones are yet generated thereby.

If inquiry 106 is answered in the negative, the CPU advances to inquiry 108 to determine if the service provider is the alternate HOME system to which the user subscribes. If so, progress tone generator 26 is preset to generate a distinctive tone indicative thereof and designated in FIG. 2 as the "alternate" tone. But, if inquiry 108 is answered in the negative, the CPU advances to inquiry 110 to determine if the service provider is one to which the user does not subscribe. If so, the progress tone generator is preset to generate a distinctive tone indicative thereof, and designated in FIG. 2 as the "ROAM" tone. Finally, if inquiry 110 is answered in the negative, the CPU advances to instruction 112 which presets the progress tone generator to generate a distinctive tone indicative of the lack of available service, which is designated in FIG. 2 as the "NO SERVICE" tone. The CPU then returns to instruction 104 to continue to scan the broadcast control channels transmitted by the base station.

As mentioned above, at this time, progress tone generator 26 simply is preset to generate either the "MAIN", the "ALTERNATE", the "ROAM" or the "NO SERVICE" tone, depending upon the availability of a communication channel from the base station and the type of service provided to this cellular telephone by the service provider which services that base station. Periodically, the CPU inquires at 116 as to whether the cellular telephone is disposed in its OFF-HOOK condition. For example, if hook switch 34, as shown in FIG. 1, is activated, inquiry 116 is answered in the affirmative. But, if the cellular telephone remains in its ON-HOOK condition, the CPU simply cycles periodically through the scanning routine (discussed above) as well as through the OFF-HOOK inquiry 116.

When inquiry 116 is answered in the affirmative, the CPU advances to instruction 118 to activate progress tone generator 26. It is at this time that the particular dial tone to which the progress tone generator has been preset now is audibly generated to provide the user with an indication of whether the cellular telephone is in communication with its HOME system or its alternate HOME system, or whether the cellular telephone is a ROAMER, or whether service is not available to this cellular telephone. After activating the progress tone generator, the CPU advances to inquire, at 120, whether HOME, alternate HOME or ROAMING service is available. If inquiry 120 is answered in the negative, that is, if service is not available, the CPU cycles through the loop formed of inquiry 116, instruction 118 and inquiry 120, and the CPU also performs the broadcast control scanning operation discussed above.

If inquiry 120 is answered in the affirmative, keypad 28 is activated by instruction 122. Thus, dial digits selected by the operation of various ones of the keys of the keypad now may be entered.

After activating the keypad, the CPU inquires, at 124, if a dial digit has been entered. If not, inquiry 126 is made to determine if a predetermined time period has timed out. For example, a four-second time period is initiated upon the actuation of the keypad, and inquiry 126 determines if this four-second period has expired. If not, the CPU cycles through the loop established by inquiries 124 and 126. Upon timing out, that is, when inquiry 126 is answered in the affirmative, validation of the entered telephone number is requested, as represented by instruction 128, whereupon the North American Numbering Plan and Dialing Procedures discussed in the aforementioned Bellcore Special Report, is carried out. As a result of this validation determination, inquiry 130 is answered either in the affirmative, thus representing that the entered telephone number is valid, or in the negative, thus representing that the entered telephone number is invalid.

Let it be assumed that after keypad 28 is activated, as at instruction 122, the user operates a key to enter a dial digit and inquiry 124 thus is answered in the affirmative. At that time, progress tone generator 26 is deactivated, as represented by instruction 132, DTMF tone generator 38 is activated, as represented by instruction 134, the dialed digit is entered into dialed number register 40, as represented by instruction 136, and the CPU then advances to inquiry 138 to determine if the user has completed his entry of dial digits. It is appreciated that, with the activation of DTMF generator 38, dialing tones are produced and audibly heard by way of loudspeaker 36.

Inquiry 138 is determined as a function of the North American Numbering Plan and Dialing Procedures. For example, if less than seven digits have been entered by the user, inquiry 138 is answered in the negative. If a prefix digit followed by less than ten digits are entered, inquiry 138 is answered in the negative. On the other hand, if seven digits have been entered, or if a prefix followed by ten digits have been entered, inquiry 138 is answered in the affirmative. As an alternative, keypad 28 may be provided with a suitable key which signifies completion of the entry of dialing digits. For example, a SEND key or the like may be actuated to indicate the completion by the user of the entry of dialing digits.

When inquiry 138 is answered in the affirmative, the CPU advances to inquire, at 140, whether the dial digits that have been entered by the user represent a valid telephone number. For example, if seven digits have been entered, inquiry 140 is answered in the affirmative. If the prefix 1 or 0 has been entered, followed by a ten digit number, including a proper three-digit area code, inquiry 140 is answered in the affirmative. Other dialing procedures described in the aforementioned Bellcore Special Report are used to determine if the entered telephone number is valid. If inquiry 140 is answered in the affirmative, the dialed digits that had been entered in register 40 (FIG. 1) are supplied to transmitter 48 and transmitted to the base station with which the cellular telephone is in communication. Thus, the entered telephone number is dialed.

However, if inquiry 140 is answered in the negative, progress tone generator 26 is preset to generate the distinctive tone indicating that the entered telephone number does not exist. That is, the progress tone generator is preset to generate the NO SUCH NUMBER tone.

Let it be assumed that a number of dial digits have been entered by the user, but less than seven such digits have been entered. Upon the entry of the last digit, inquiry 138 is answered in the negative, and the CPU returns to inquiry 124. If no further digits are entered, the CPU cycles through the loop established by inquiries 124 and 126 until the aforementioned predetermined time period (e.g. four seconds) times out. At that time, inquiry 126 is answered in the affirmative and the CPU advances to instruction 128 to request validation of the digits that had been entered thus far.

Since it has been assumed that less than seven digits have been entered, inquiry 130 is answered in the negative, that is, a valid telephone number has not been entered, and progress tone generator 26 is preset to generate the distinctive tone representing the "OFF-HOOK" condition. Hence, the OFF-HOOK tone is generated and the user thus is provided with an indication that the cellular telephone simply is in its off-hook condition awaiting the entry of a correct telephone number. It will be appreciated that, in this instance, the OFF-HOOK tone constitutes a time-out indication.

In an alternate embodiment, rather than having inquiry 138 answering in the affirmative after seven dial digits have been entered (this inquiry can determine whether ten dial digits have been entered or if a suitable completion key has been activated), the determination of whether the entered digits constitutes a seven-digit telephone number may be made by inquiry 130 which determines if seven dial digits have been entered after the aforementioned time-out period has expired. That is, after entry of the seventh dial digit, inquiry 126 eventually is answered in the affirmative; whereupon the CPU advances torequest validation at instruction 128 and inquiry 130 is answered in the affirmative if seven dial digits have been entered.

Figure 3:
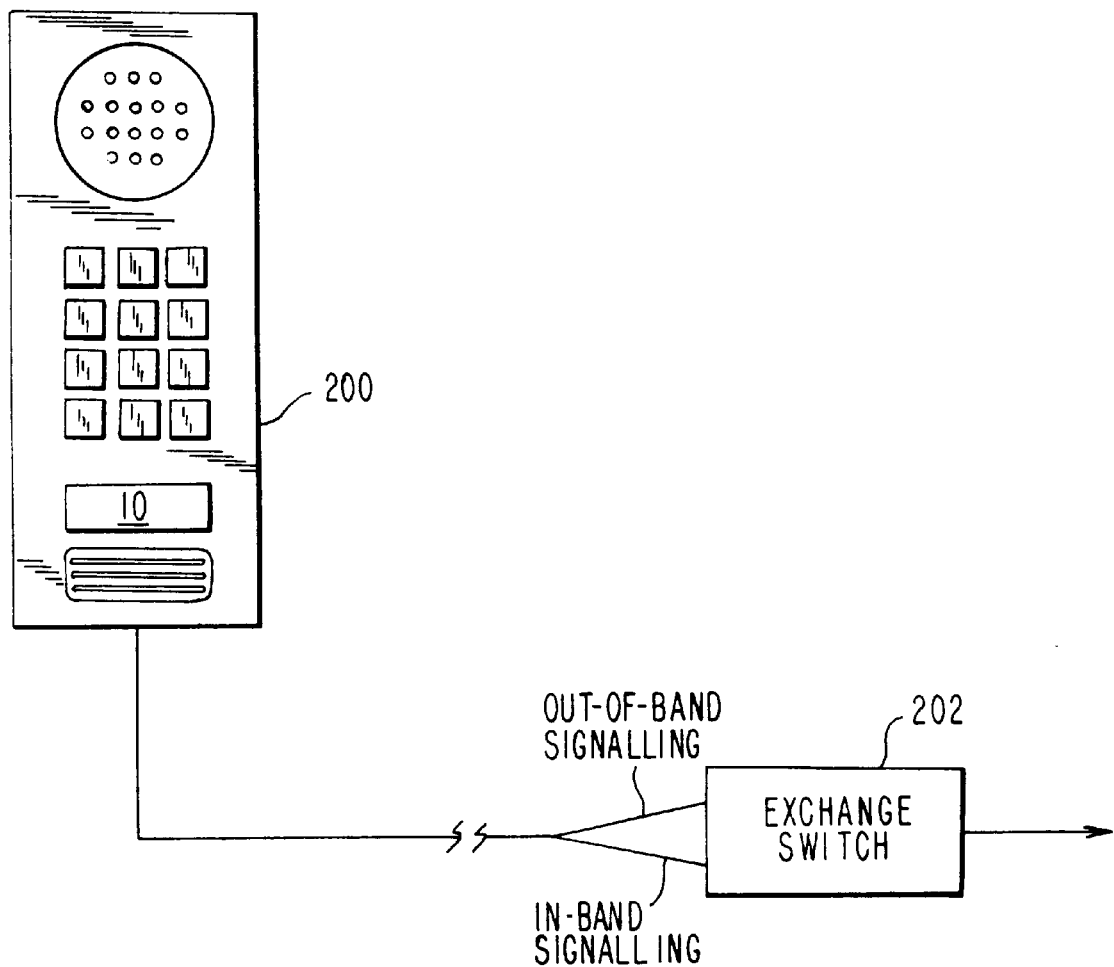
FIG. 3 is a block diagram of an out-of-band land line telephone system in which the present invention is included.

The foregoing has described the generation of distinctive tones in the environment of a cellular telephone. It will be appreciated that signalling apparatus 10 of the present invention is equally applicable to and may be disposed within the housing of a land-line telephone instrument 200 that is connected to an exchange switch 202 in a system in which out-of-band signalling is used to communicate telephone system control information and in-band signalling is used to communicate voice signals, such as shown in FIG. 3. In that event, the out-of-band control information transmitted by such telephone system is analogous to the overhead message train transmitted to the cellular telephone from the base station, as described above. Typically, the out-of-band control information that is transmitted to the telephone instrument 200 from the telephone system includes data which indicates whether service is available to that telephone instrument. Usually, such a telephone system does not transmit data corresponding to the HOME, alternate HOME and ROAM indications such as are provided in a cellular telephone system Of the type described above in conjunction with FIG. 1.

While the present invention has been particularly shown and described with reference to certain preferred embodiments, it will be readily appreciated by those of ordinary skill in the art that various changes and modifications may be made without departing from the spirit and scope of the invention. For example, the determination of whether dial digits entered by the user constitute a valid telephone number may be determined by techniques and procedures other than the North American Numbering Plan and Dialing Procedures described in the aforementioned Bellcore Special Report. Nevertheless, it is preferred that telephone number validation be carried out in accordance with the dialing procedures and techniques discussed in that report.

It is intended that the appended claims be interpreted as covering the preferred embodiments described herein, those alternatives which have been mentioned and all equivalents thereto.

What is claimed is:

1. Tone generating apparatus included in a cellular telephone which simulates tones normally sensed by a user of a land-line telephone, the cellular telephone being of the type adapted to communicate with a base station via a service provider and having a keypad comprised of plural keys for user-entry of telephone number dialing digits and scanning means for scanning service provider indications of user accessible communication channels provided by said base station to detect an available communication channel and type of service provided by the service provider on that channel for communication between said cellular telephone and said base station, in which the type of service provided by the service provider is one of a HOME service, a ROAM service, and an alternate HOME service, said apparatus comprising:

progress tone generating means actuable to generate for the user selected dial tone indications as a function of the detected type of service provided by the service provider for communication between said cellular telephone and said base station, in which said progress tone generating means is actuable to generate a distinctive tone for each of the HOME service, the ROAM service, and the alternate HOME service;

means responsive to actuation of said keypad to produce digit data representing the respective keys which are actuated and to generate digit tones identifying said respective keys; and digit data transmit means for transmitting said digit data to said base station to dial a respective telephone number.

2. The apparatus of claim 1 wherein said HOME service is a type of service wherein the user subscribes to the service provider and said ROAM service is a type of service wherein the user does not subscribe to the service provider.

3. The apparatus of claim 2 wherein said scanning means is operative to detect when a communication channel is not available; and said progress tone generating means is actuable to generate a NO SERVICE dial tone when said scanning means detects that a communication channel is not available.

4. The apparatus of claim 1 wherein said means responsive to the actuation of said keypad includes means for generating a time-out indication if a predetermined time period expires between successive actuations of said keypad before digit data comprising a complete telephone number has been produced; and said progress tone generating means generates a time-out tone in response to said time-out indication.

5. The apparatus of claim 4 wherein said means responsive to the actuation of said keypad further includes means for indicating when said digit data comprises a complete telephone number.

6. The apparatus of claim 5 wherein said means responsive to the actuation of said keypad additionally includes means for sensing if the digit data which is indicated as comprising a complete telephone number represents a valid telephone number, and means for supplying said digit data to said digit data transmit means for transmission to said base station when a valid telephone number is sensed.

7. The apparatus of claim 6 wherein said means for sensing includes means for actuating said progress tone generating means when a valid telephone number is not sensed, thereby to generate a distinctive NO SUCH NUMBER tone indication.

8. The apparatus of claim 1 wherein said progress tone generating means includes preset means responsive to the detected type of service provided by the service provider for presetting a particular dial tone indication, and switch means responsive to an OFF-HOOK condition of said cellular telephone to actuate said progress tone generating means to generate the preset dial tone indication to be sensed by the user.

9. The apparatus of claim 8 further comprising means for deactuating said progress tone generating means when said keypad is actuated to generate said digit data.

10. The apparatus of claim 1 wherein said digit data corresponds to telephone number digits and wherein said means responsive to actuation of said keypad includes validity detection means for detecting when the telephone number digits corresponding to said digit data represent a valid telephone number.

11. The apparatus of claim 10 wherein said validity detection means includes time-out means triggered by each telephone number digit to time out a predetermined time thereafter, and sense means responsive to the timing out of said time-out means to sense if the quantity of telephone number digits that had been produced is equal to the quantity of telephone number digits which comprise a valid telephone number.

12. The apparatus of claim 11 wherein said validity detection means further includes prefix sensing means for sensing if the quantity of telephone number digits includes a predetermined prefix digit and, if so, whether said quantity of telephone number digits is at least a predetermined amount.

13. The apparatus of claim 12 wherein said predetermined amount is ten digits.

14. The apparatus of claim 13 wherein said predetermined prefix digit is 1 or 0.

15. The apparatus of claim 12 wherein said validity detection means additionally includes area code sensing means for sensing if a pre-established group of telephone number digits which follows said prefix digit identifies an area code and, if not, whether more than a fixed quantity of telephone number digits had been produced, thereby generating a distinctive NO SUCH NUMBER tone indication.

16. The apparatus of claim 11 wherein said validity detection means further includes means responsive to the timing out of said time-out means to generate a distinctive tone indication if the quantity of telephone number digits that had been produced differs from the quantity of telephone number digits which comprise a valid telephone number.

17. The apparatus of claim 16 further comprising transducer means responsive to said distinctive tone indication generated in response to said time-out means to generate an audible signal.

18. The apparatus of claim 1 further comprising transducer means for generating corresponding audible signals in response to said selected dial tone indications and in response to said digit tones.

19. An apparatus included in a cellular telephone, the cellular telephone being of the type adapted to communicate with a base station via a service provider and having a keypad comprised of plural keys for user-entry of telephone number dialing digits and means for detecting an available communication channel and type of service provided by the service provider on that channel for communication between said cellular telephone and said base station, in which the type of service provided by the service provider is one of a HOME service, a ROAM service, and an alternate HOME service, said apparatus comprising:

generating means actuable to generate for a user one of selected dial tone indications and voice messages as a function of the detected type of service provided by the service provider for communication between said cellular telephone and said base station, in which said generating means is actuable to generate one of a distinctive tone and a respective voice message for each of the HOME service, the ROAM service, and the alternate HOME service;

means responsive to actuation of said keypad to produce digit data representing the respective keys which are actuated and to generate digit tones identifying said respective keys; and digit data transmit means for transmitting said digit data to said base station to dial a respective telephone number.

* * * * *